United States Patent
Hayashi et al.

(10) Patent No.: US 10,576,530 B2
(45) Date of Patent: Mar. 3, 2020

(54) HOLDING MECHANISM

(71) Applicants: DAIDO STEEL CO., LTD., Nagoya-shi (JP); SAKAMURA HOT ART CO., LTD., Kuse-gun (JP)

(72) Inventors: Hideaki Hayashi, Tokai (JP); Masahiro Isaki, Tokai (JP); Daisuke Enomoto, Kyoto (JP); Masahiro Taniguchi, Kyoto (JP); Minoru Enomoto, Kyoto (JP)

(73) Assignees: DAIDO STEEL CO., LTD., Nagoya-Shi, Aichi (JP); SAKAMURA HOT ART CO., LTD., Kuse-Gun, Kyoto (JP)

( * ) Notice: Subject to any disclaimer, the term of this patent is extended or adjusted under 35 U.S.C. 154(b) by 88 days.

(21) Appl. No.: 15/602,221

(22) Filed: May 23, 2017

(65) Prior Publication Data
US 2017/0341131 A1   Nov. 30, 2017

(30) Foreign Application Priority Data

May 26, 2016 (JP) .................................. 2016-105671
May 26, 2016 (JP) .................................. 2016-105672

(51) Int. Cl.
*B21J 13/10* (2006.01)
*B25J 15/00* (2006.01)
(Continued)

(52) U.S. Cl.
CPC .............. *B21J 13/10* (2013.01); *B21K 27/04* (2013.01); *B25B 27/023* (2013.01);
(Continued)

(58) Field of Classification Search
CPC ..... B21J 13/08; B21J 13/10; B21J 9/00; B21J 9/02; B66C 17/18; B65G 47/90;
(Continued)

(56) References Cited

U.S. PATENT DOCUMENTS 1,475,810 A * 11/1923 Frisz ..................... B25B 27/023
                                                                      29/261
1,683,188 A *  9/1928 Howell ................. B25B 27/023
                                                                      29/261
(Continued)

FOREIGN PATENT DOCUMENTS

CN        2483118 Y      3/2002
CN        2500412 Y      7/2002
(Continued)

OTHER PUBLICATIONS

Design of a Robot Gripper for a Rapid Service Robot; Mechanical Engineering Department, Korea Advanced Institute of Science and Technology, Dae-jeon, Korea (Year: 2013).*
(Continued)

*Primary Examiner* — Monica S Carter
*Assistant Examiner* — Mahdi H Nejad
(74) *Attorney, Agent, or Firm* — McGinn I. P. Law Group, PLLC.

(57) ABSTRACT

The present invention provides a holding mechanism capable of well preventing misalignment of a workpiece even if the outer diameter of the workpiece is changed when the workpiece is supported at three points by a flat face and a V-shaped groove. Additionally, the present invention provides a holding mechanism of a transfer device capable of stably detecting a chucking error of holding claws for a workpiece.

13 Claims, 10 Drawing Sheets

(51) Int. Cl.
*B25B 27/02* (2006.01)
*B25J 15/08* (2006.01)
*B25J 15/02* (2006.01)
*B21K 27/04* (2006.01)

(52) U.S. Cl.
CPC ....... *B25J 15/0042* (2013.01); *B25J 15/0273* (2013.01); *B25J 15/08* (2013.01); *Y10T 29/5387* (2015.01)

(58) Field of Classification Search
CPC ........ B25J 15/00; B25J 15/08; B25J 15/0009; B25J 15/0028; B25J 15/0266; B25J 15/0273; B25J 15/0042; B25J 15/0253; Y10T 29/5387; B25B 27/026; B25B 27/023; Y10S 901/31
USPC ................ 294/106, 198, 207, 119.1; 72/361; 901/31, 36, 39
See application file for complete search history.

(56) References Cited

U.S. PATENT DOCUMENTS

| | | | | | |
|---|---|---|---|---|---|
| 3,069,761 | A | * | 12/1962 | Sommer | B25B 27/026 29/252 |
| 3,370,213 | A | * | 2/1968 | Rose | B25J 13/082 294/106 |
| 3,945,676 | A | * | 3/1976 | Asamoto | B25J 15/022 294/202 |
| 4,368,913 | A | * | 1/1983 | Brockmann | B25J 15/0266 294/106 |
| 4,505,636 | A | * | 3/1985 | Sugino | B25J 17/0241 294/86.4 |
| 4,635,985 | A | * | 1/1987 | Rooke | B25J 15/0052 294/119.1 |
| 4,647,097 | A | * | 3/1987 | Lessway | B25J 15/028 294/119.1 |
| 4,699,414 | A | * | 10/1987 | Jones | B25J 15/026 294/119.1 |
| 4,900,078 | A | * | 2/1990 | Bloch | B25J 9/104 294/119.1 |
| 5,819,386 | A | * | 10/1998 | Koppe | B25B 27/023 29/261 |
| 5,938,257 | A | * | 8/1999 | Blatt | B25J 15/0273 294/119.1 |
| 5,983,474 | A | * | 11/1999 | Koppe | B25B 27/023 29/261 |
| 6,272,892 | B1 | * | 8/2001 | Ozaki | B21J 9/20 72/21.3 |
| 7,950,709 | B1 | * | 5/2011 | Cheney | B66C 1/427 294/103.1 |
| 8,801,063 | B2 | * | 8/2014 | Nammoto | B25J 15/10 294/106 |
| 2010/0078953 | A1 | * | 4/2010 | Ban | B25J 15/0266 294/106 |
| 2017/0313559 | A1 | * | 11/2017 | Lauderbaugh | B66F 3/25 |
| 2017/0341126 | A1 | * | 11/2017 | Hayashi | B21J 13/08 |

FOREIGN PATENT DOCUMENTS

| | | | |
|---|---|---|---|
| CN | 202343842 U | | 7/2012 |
| CN | 104785702 A | | 7/2015 |
| GB | 2041262 | * | 9/1980 |
| JP | S48-44180 U | | 6/1973 |
| JP | S50-52677 U | | 5/1975 |
| JP | S51-112064 A | | 10/1976 |
| JP | S62-208884 A | | 9/1987 |
| JP | H2-47191 U | | 3/1990 |
| JP | H4-261791 A | | 9/1992 |
| JP | 6-226675 A | | 8/1994 |
| JP | H6-71005 U | | 10/1994 |
| JP | H6-74209 U | | 10/1994 |
| JP | H7-290392 A | | 11/1995 |
| JP | H07-299513 A | | 11/1995 |
| JP | H11-092034 A | | 4/1999 |
| JP | 2000-094070 A | | 4/2000 |
| JP | 2009-28752 A | | 2/2009 |
| JP | 2013-043228 A | | 3/2013 |
| JP | 2013043228 | * | 3/2013 |
| JP | 2013-078791 A | | 5/2013 |
| JP | 5544946 B2 | | 7/2014 |
| JP | H2016-043465 A | | 4/2016 |

OTHER PUBLICATIONS

Optimal Design for Heavy Forging Robot Grippers; Qunming Li, a, Qinghua Qin, Shiwei Zhang and Hua Deng; School of Mechanical and Electrical Engineering, Central South University, Changsha (Year: 2010).*
An Optimization Problem Algorithm for Kinematic Design of Mechanisms for Two-Finger Grippers (Year: 2009).*
Unsolicited Thoughts—In Science (Year: 2016).*
Chinese Office Action, dated Aug. 27, 2018, in Chinese Application No. 201710384120.X and English Translation thereof.
Japanese Office Action, dated Nov. 26, 2019, in Japanese Application No. 2016-105671 and English Translation thereof.
Japanese Office Action, dated Dec. 3, 2019, in Japanese Application No. 2016-105672 and English Translation thereof.

* cited by examiner

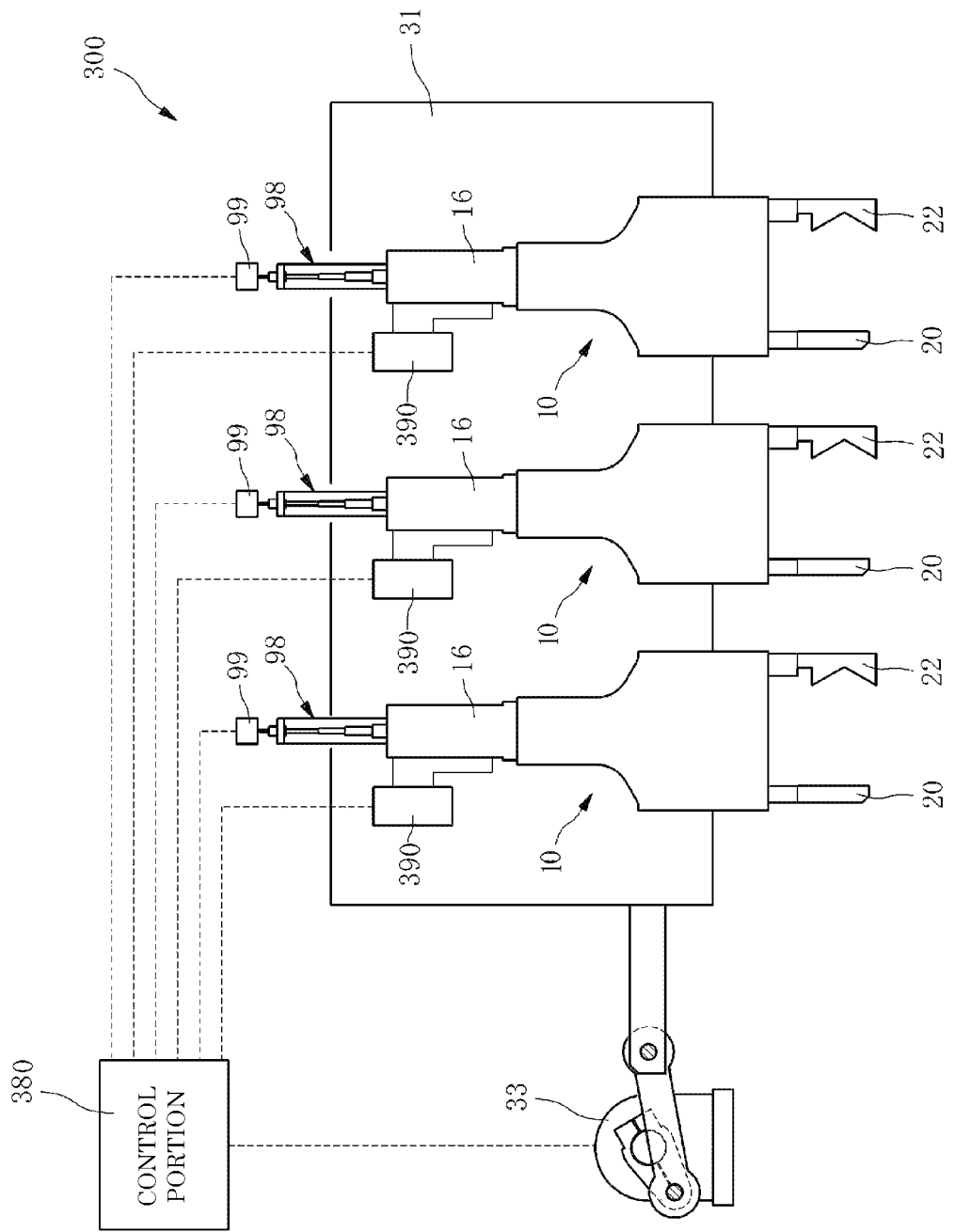

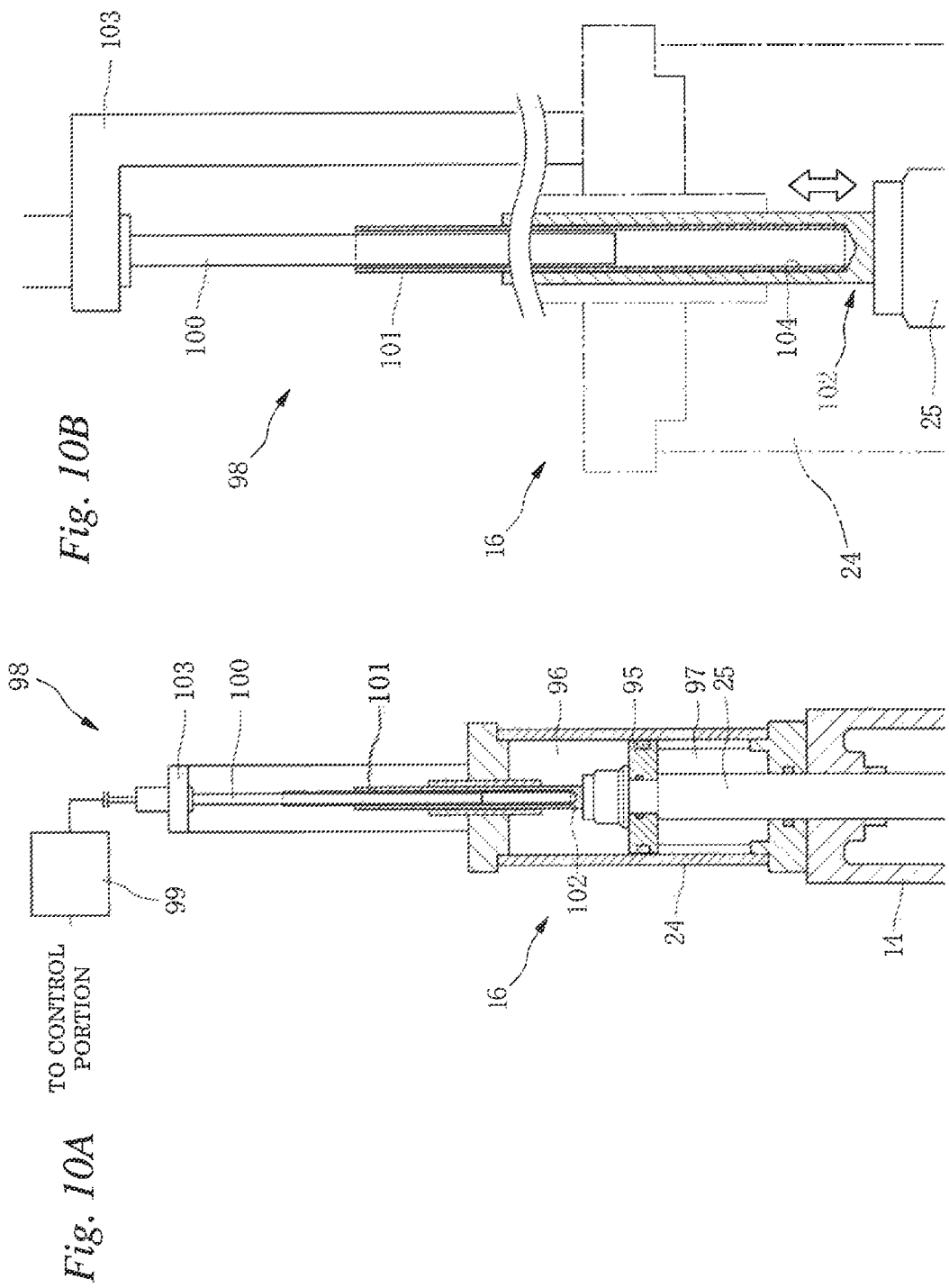

HOLDING MECHANISM

FIELD OF THE INVENTION

The present invention relates to a holding mechanism, and particularly relates to a holding mechanism for holding a workpiece at three points. The present invention also relates to a holding mechanism of a transfer device, and particularly relates to a holding mechanism capable of detecting a chucking error for a workpiece.

BACKGROUND OF THE INVENTION

In a transfer device provided in a multistage forging press machine in which a plurality of forging portions having dies and punches are provided side by side in a horizontal direction, a workpiece whose outer circumference has a circular shape is held by use of holding claws in each forging portion, and conveyed to the next forging portion.

Various shapes are used as the shapes of the holding claws for holding the workpiece whose outer circumference has a circular shape.

FIG. 6A shows an example in which holding faces of a pair of holding claws are formed into arc shapes. According to the example, an assured holding function can be expected when the outer shape of a workpiece coincides with the arc shape formed in each holding face. However, when the outer diameter of the workpiece is changed, the holding claws have to be replaced. In this case, facilities have to be suspended due to replacement of the holding claws and adjustment following the replacement, causing reduction in facility operation rate.

FIG. 6B shows an example in which two holding claws are provided in a front end of each of arms disposed vertically, so that a workpiece can be held at four points. Of the holding claws supporting the workpiece at the four points, the lower ones are fixedly positioned while only the upper ones can move. When the outer diameter of the workpiece is changed, the central position of the workpiece is changed. It is therefore necessary to replace the holding claws or adjust the positions of the holding claws, causing the same problem as in the case of FIG. 6A.

FIG. 6C shows an example in which, of holding surfaces of a pair of holding claws disposed to be opposed to each other on both sides of a workpiece in a horizontal direction, one is formed into a flat face and the other is formed into a V-shaped groove so that the workpiece can be held at three points. According to the example in which the holding claws support the workpiece at the three points, there also arises a problem that the central position of the workpiece is displaced (hereinafter also referred to as "misaligned") when the diameter of the workpiece to be held is changed. This problem will be described with reference to FIG. 7A to FIG. 7C.

Assume that a large-diameter workpiece $W_1$ shown in FIG. 7A is held by a holding claw 110 whose holding face is formed into a flat face and a holding claw 112 whose holding face is formed into a V-shaped groove, and the workpiece $W_1$ has a workpiece center $O_1$ in this case.

After that, the holding claws 110 and 112 are moved in closing directions respectively by one and the same amount, so as to hold a small-diameter workpiece $W_2$ shown in FIG. 7B. Assume that the workpiece $W_2$ has a workpiece center $O_2$ in that case. As shown in FIG. 7B, a positional displacement (misalignment) $\delta$ appears between the workpiece centers $O_1$ and $O_2$.

The misalignment $\delta$ with which a workpiece is held causes deterioration in conveyance position accuracy for the workpiece. Thus, processing accuracy of a product to be manufactured is deteriorated.

Incidentally, shapes of holding claws for holding a circular workpiece have been, for example, disclosed in the following Patent Document 1 and Patent Document 2.

The following Patent Document 1 discloses an invention as to a "robot hand", in which a front end part of each holding claw for holding a workpiece is made expandable and contractible in a longitudinal direction of the holding claw so that the front end part of the holding claw can be expanded and contracted in accordance with a change in outer diameter of the workpiece when the outer diameter of the workpiece is changed.

However, according to Patent Document 1, in which the holding claws support the workpiece at four points, there is no suggestion about the problem belonging to the aforementioned example in which holding claws support a workpiece at three points. In addition, an opening/closing mechanism of the holding claws is different from that in the present invention.

The following Patent Document 2 discloses an invention as to a "workpiece conveyance device", in which a workpiece can be supported at three points by a flat face and a V-shaped groove.

In Patent Document 2, however, there is no suggestion about the problem belonging to the aforementioned example in which a workpiece is supported at three points, that is, the problem of misalignment occurring when the outer diameter of the workpiece is changed. In addition, there is no specific suggestion about a mechanism for opening/closing holding claws.

In a transfer device provided in a multistage forging press machine in which a plurality of forging portions having dies and punches are provided side by side in a horizontal direction, a so-called chucking error may occur when a workpiece is held by a pair of holding claws. The chucking error includes, for example, a failure that the workpiece is dropped or a failure that the workpiece is held in a state where the workpiece is inclined more obliquely than in a regular state.

Such a chucking error makes it difficult to form a product into a predetermined shape. In addition, the chucking error may interfere with the device to cause a device trouble. It is therefore necessary to detect the chucking error as soon as the chucking error occurs.

As a specific method for detecting an error in chucking a workpiece, the following Patent Document 3 discloses an example in which a voltage is applied to a pair of holding claws so that a chucking error can be electrically detected based on a voltage change appearing in a detection circuit when the workpiece is not located between the holding claws (that is, when there is a chucking error).

In the example disclosed in Patent Document 3, it is possible to detect the presence/absence of a workpiece, but there is a problem that it is impossible to detect a chucking error in a state where the workpiece inclined obliquely is held.

On the other hand, the following Patent Document 4 discloses an example in which a detection plate is attached to an intermediate portion of an operating rod moving in a vertical direction when three holding claws (fingers) holding a workpiece are operated to be opened/closed, and a moving amount of the detection plate is detected by an eddy-current type sensor, so that waveform data obtained by the sensor can be regarded as equivalent to an opening amount of the holding claws, and abnormality can be detected based on the waveform data.

However, according to the example disclosed in Patent Document 4, the sensor is attached to the vicinity of a workpiece to be forged. The workpiece is typically processed at a high temperature of about 1,200° C. to 1,000° C. The sensor provided near the workpiece is affected by scattering of scales or heat so that the sensor cannot detect the opening degree of the holding claws stably.

In addition, one end of the operating rod to which the detection plate is attached moves vertically while the other end thereof moves circularly. Therefore, the motion of the detection plate is complicated during the opening/closing motion of the holding claws. Thus, the range where the position of the operating rod can be detected is limited to a narrow range.

Patent Document 1: Japanese Patent No. 5544946
Patent Document 2: JP-A-2013-43228
Patent Document 3: JP-A-2000-94070
Patent Document 4: JP-A-2013-78791

SUMMARY OF THE INVENTION

In the example in which a workpiece is supported at three points, the aforementioned misalignment occurs for the following reason.

In a state where the holding claws have held a workpiece $W_1$ having a large diameter as shown in FIG. 7A, the holding claws on both sides of the workpiece $W_1$ are moved in closing directions respectively by one and the same amount in order to hold a workpiece $W_2$ having a small diameter and having the same central position $O_1$ as the workpiece $W_1$. In this case, as shown in FIG. 7C, only the holding claw 110 having a flat face first abuts against the workpiece $W_2$. At this time, there remains a gap between the workpiece $W_2$ and the holding claw 112 having a V-shaped groove. When the holding claws 110 and 112 on both sides are moved further in the closing directions in this state, the workpiece $W_2$ is moved to the illustrated right by the holding claw 110 having the flat face. Finally, as shown in FIG. 7B, the workpiece $W_2$ is held by the two holding claws 110 and 112 with its workpiece center at a different position $O_2$ from that in FIG. 7A.

As is also understood from this, misalignment occurs when the diameter of a workpiece is changed. That is, due to the asymmetric positions in the horizontal direction where the holding claws abut against the workpiece respectively, amounts with which the two holding claws must move to abut against the workpiece are different from each other. Therefore, the moving amount of the holding claw 112 having the V-shaped groove is insufficient to hold the workpiece without changing the central position of the workpiece.

The present invention has been developed in consideration of the aforementioned situation. An object of the present invention is to provide a mechanism for holding a workpiece so that misalignment of the workpiece can be well prevented even if the outer diameter of the workpiece is changed when the workpiece is supported at three points by a flat face and a V-shaped groove.

In addition, another object of the present invention developed in consideration of the aforementioned situation is to provide a holding mechanism of a transfer device capable of stably detecting a chucking error of holding claws for a workpiece.

Namely, the present invention relates to the following configurations (1) to (5).

(1) A holding mechanism including:
a pair of holding claws that are disposed to be opposed to each other on both sides of a workpiece in a horizontal direction, a holding face of one of the holding claws being formed into a flat face, a holding face of the other holding claw being formed into a V-shaped groove;
a driving unit that moves an output shaft forward and backward; and
a link mechanism that converts a forward/backward motion of the output shaft into an opening/closing motion in the horizontal direction and transmits the opening/closing motion to the pair of holding claws,
in which, when the pair of holding claws are moved to be opened/closed in the horizontal direction, the holding claw having the V-shaped groove is moved more than the holding claw having the flat face.

(2) The holding mechanism according to (1), in which the link mechanism includes:
(a) a driving link that is connected to the output shaft to move forward/backward together with the output shaft;
(b) an opening/closing motion generating unit comprising a pair of tilting links, a connection pin, and slide pins, the pair of tilting links being separated to extend in opposite directions to each other, one ends of the tilting links being rotatably connected to each other through the connection pin, the tilting pins being rotatably connected to the driving link through the connection pin, the slide pins being provided at the other ends of the tilting links respectively so that the slide pins move along guide grooves formed in a base and extending in the horizontal direction; and
(c) a pair of output links that are connected to the slide pins of the opening/closing motion generating unit and the holding claws so as to move the holding claws in the horizontal direction in accordance with positions of the slide pins, and
when the holding claws are moved in a closing direction, the connection pin of the opening/closing motion generating unit is moved in an inclination direction inclined toward the holding claw having the flat face rather than in a vertical direction perpendicular to the horizontal direction.

(3) The holding mechanism according to (2), in which a guide groove for guiding movement of the connection pin of the opening/closing motion generating unit is formed in the base, and the guide groove is provided to be inclined in the inclination direction.

(4) The holding mechanism according to (2) or (3), in which a plurality of the opening/closing motion generating units are provided in the vertical direction along the driving link.

(5) The holding mechanism according to any one of (1) to (4), further including:
a position detection unit that is provided in an opposite end portion of the output shaft to the holding claws so as to detect a position of the output shaft, the position detection unit including a detection portion constituted by a detection rod and a sleeve fitted onto the detection rod so that either the detection rod or the sleeve moves together with the output shaft; and
an abnormality detection unit that detects a chucking error of the holding claws for the workpiece, based on an output from the position detection unit.

In the case where a workpiece is supported at three points by a flat face and a V-shaped groove as described previously, misalignment occurs between a workpiece having a large outer diameter and a workpiece having a small outer diameter. This is because amounts with which two holding claws must move to abut against the workpiece when the diameter of the workpiece is changed are different from each other so that a sufficient moving amount cannot be secured for the holding claw having the V-shaped groove.

Therefore, in order to hold the workpiece without changing the central position of the workpiece even when the diameter of the workpiece is changed, the moving amount of the holding claw having the V-shaped groove must be made larger than the moving amount of the holding claw having the flat face when the pair of holding claws are moved.

According to the present invention based on such findings, a link mechanism for converting a forward/backward motion of an output shaft of a driving unit into an opening/closing motion in a horizontal direction is used so that the holding claw having the V-shaped groove can be moved more than the holding claw having the flat face when the pair of holding claws are moved in opening/closing directions.

In this manner, when the pair of holding claws are moved, the moving amount of the holding claw having the V-shaped groove is increased so that the workpiece can be effectively prevented from being misaligned due to shortage of the moving amount of the holding claw having the V-shaped groove.

A specific amount by which the holding claw having the V-shaped groove should be moved more than the holding claw having the flat face depends on an angle of each slope of the V-shaped groove abutting against the workpiece. When an angle θ of the slope of the V-shaped groove formed in the holding claw 112 with an imaginary line in the horizontal direction shown in FIG. 7A is, for example, 60°, the misalignment of the workpiece can be effectively prevented if the holding claw 112 having the V-shaped groove is moved 1.15 times as much as the holding claw 110 having the flat face.

In this manner, according to the present invention, it is possible to dispense with work of replacement and adjustment of the holding claws when the outer diameter of the workpiece is changed, so that it is possible to improve the facility operation rate of target facilities.

According to the aforementioned configuration (2), the link mechanism for converting the forward/backward motion of the output shaft into the opening/closing motion in the horizontal direction is configured to include an opening/closing motion generating unit including a pair of tilting links, a connection pin, and slide pins. The tilting links are separated to extend in opposite directions to each other. One ends of the tilting links are rotatably connected to each other through the connection pin while the tilting links are rotatably connected to the driving link through the connection pin. The slide pins are provided at the other ends of the tilting links respectively so that the slide pins can move along guide grooves formed in a base and extending in the horizontal direction. When the holding claws are moved in closing directions, the connection pin of the opening/closing motion generating unit is moved in an inclination direction inclined toward the holding claw having the flat face rather than in a vertical direction perpendicular to the horizontal direction.

Due to the configuration, the opening/closing motion generating unit as a whole moves toward the holding claw having the flat face together with the connection pin of the opening/closing motion generating unit when the holding claws are moved in the closing directions. Thus, in accordance with an amount of the movement of the opening/closing generating unit, the holding claw having the V-shaped groove can be moved more than the holding claw having the flat face.

Incidentally, an inclination angle with which the connection pin should be moved in order to prevent misalignment depends on lengths of the tilting links constituting the opening/closing motion generating unit, or an angle of each slope of the V-shaped groove in the holding claw. Therefore, an optimum inclination angle may be used suitably in accordance with necessity.

According to the present invention, a guide groove for guiding movement of the connection pin may be formed in the base, and the guide groove may be provided to be inclined in the inclination direction (the aforementioned configuration (3)).

With this configuration, it is possible to easily define a track of the connection pin moving in the inclination direction.

In addition, when a moving amount of the holding claw having the V-shaped groove must be changed, an inclination angle of the guide groove may be changed. Thus, the track of the connection pin can be adjusted easily.

In addition, according to the present invention, a plurality of the opening/closing motion generating units may be provided in the vertical direction along the driving link (the aforementioned configuration (4)).

With this configuration, each of the output links for moving the holding claws in the horizontal direction in accordance with the positions of the slide pins can be connected to a plurality of the slide pins and supported thereon. Thus, the output links can be prevented from tilting, so that the positional accuracy of the holding claws can be enhanced.

In addition, it is preferable that the holding mechanism thus configured according to the present invention further includes a position detection unit that is provided in an opposite end portion of the output shaft to the holding claws so as to detect a position of the output shaft, and an abnormality detection unit that detects a chucking error of the holding claws for the workpiece based on an output from the position detection unit.

A workpiece to be forged is generally at a high temperature of about 1,200° C. to 1,000° C. Even if a sensor for detecting an opening degree of the holding claws is provided near the workpiece or the holding claws holding the workpiece, the sensor may be affected by scattering of scales or heat. It is therefore difficult to detect the opening degree of the holding claws stably.

On the other hand, in the aforementioned configuration (5), the position of the output shaft of the driving unit moving in connection with the opening/closing motion of the holding claws is detected to detect a chucking error.

Particularly in the aforementioned configuration (5), the position detection unit is provided in the opposite end portion of the output shaft to the holding claws. Due to the configuration, the position of the output shaft corresponding to the opening degree of the holding claws can be detected stably without being affected by scattering of scales or heat. It is possible to detect a chucking error based on the detected position of the output shaft.

In addition, the motion of the output shaft whose position should be detected is a simple motion in which the output shaft moves forward and backward in its axial direction. Thus, the position of the output shaft can be detected over a wide range in the axial direction by use of a commonly used displacement sensor such as a sleeve sensor or a differential transformer type sensor. It is therefore possible to detect a chucking error for a wide range of workpieces from a workpiece having a small outer diameter to a workpiece having a large outer diameter.

In addition, in the aforementioned configuration (5), the position detection unit may have a detection portion constituted by a detection rod and a sleeve fitted onto the detection rod so that either the detection rod or the sleeve can move together with the output shaft.

With this configuration, even when the output shaft has to be moved a long distance in the axial direction, the detectable length of the detection portion can be increased in the axial direction. Thus, the position of the output shaft can be detected easily.

On that occasion, there occurs no interference between the detection portion and another component constituting the holding mechanism because the detection portion is provided in the opposite end portion of the output shaft to the holding claws.

In addition, the aforementioned configuration (5) is suitable particularly in a case where the pair of holding claws move respectively to prevent displacement of the central position of the workpiece abutting against a pair of holding faces of the holding claws when the opening degree of the holding claws is changed.

In the background art, when the outer diameter of a workpiece is changed, there arises a problem that the central position of the workpiece is displaced when the workpiece is held. Therefore, the holding claws have to be replaced. However, in the configuration in which the pair of holding claws move respectively to prevent displacement of the central position of the workpiece abutting against the pair of holding faces when the opening degree of the holding claws is changed, the holding claws can be used without replacement in spite of the changed outer diameter of the workpiece. It is therefore possible to dispense with work of replacement of the holding claws and adjustment thereof following the replacement. Thus, the facility operation rate of the target facilities can be enhanced.

In this case, when the same holding claws are used over a range from a workpiece having a small outer diameter to a workpiece having a large outer diameter, the holding claws used have a wide range of opening degrees from a small degree to a large degree. In accordance therewith, the moving distance of the output shaft is also increased. However, the position of the output shaft can be detected over a long moving distance in the holding mechanism according to the present invention. It is therefore possible to detect a chucking error for workpieces having different outer diameters, from a workpiece having a small outer diameter to a workpiece having a large outer diameter.

According to the present invention thus configured, it is possible to provide a holding mechanism capable of well preventing misalignment of a workpiece even if the outer diameter of the workpiece is changed when the workpiece is supported at three points by a flat face and a V-shaped groove.

In addition, according to the present invention thus configured, it is possible to provide a holding mechanism of a transfer device capable of stably detecting a chucking error of holding claws for a workpiece.

BRIEF DESCRIPTION OF THE DRAWINGS

FIG. 9 is a view showing a schematic configuration of a transfer device in FIG. 8.

FIGS. 10A and 10B are enlarged views showing a body portion of an air cylinder in FIG. 1A and peripheral portions thereof.

DETAILED DESCRIPTION OF THE INVENTION

Next, an embodiment of the present invention will be described in detail with reference to the drawings.

Figures 1A, 1B:
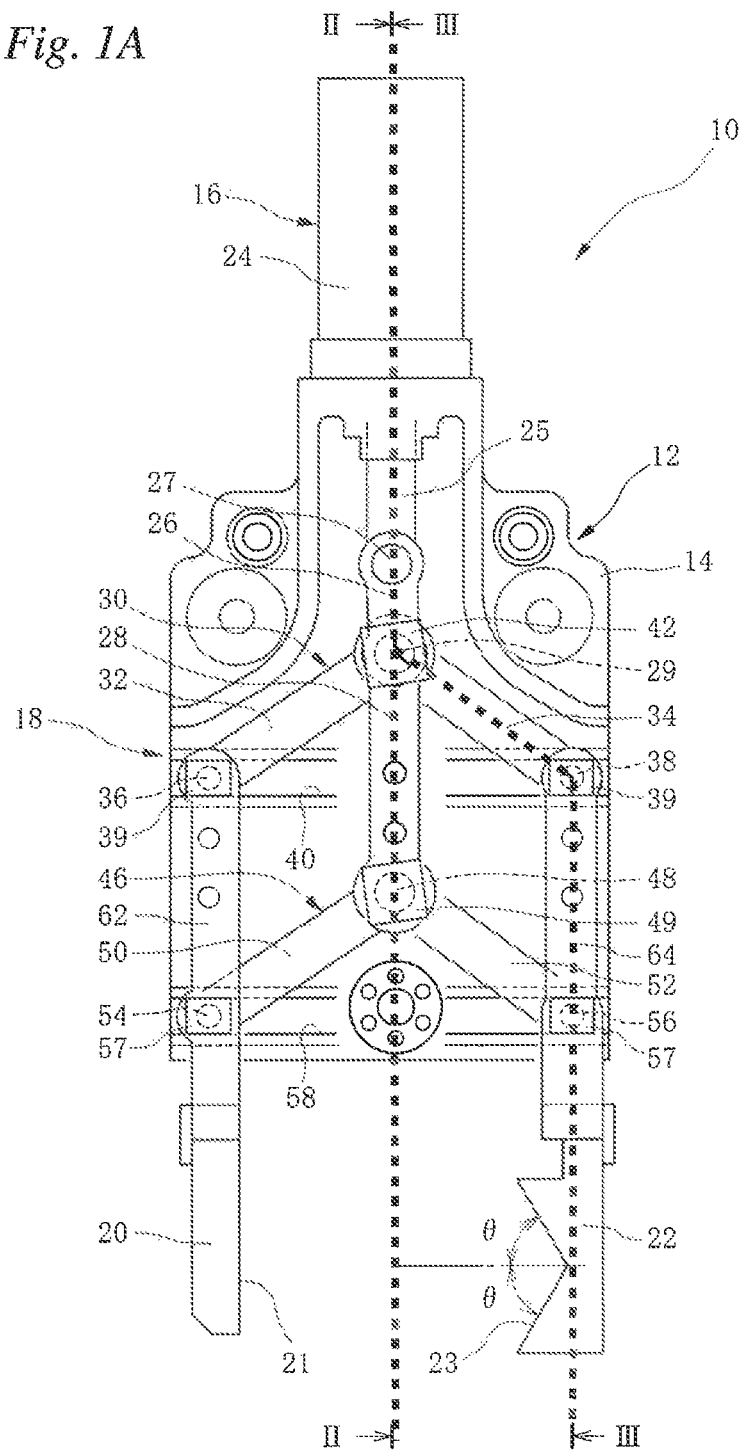
FIGS. 1A and 1B are views showing a configuration of a holding device having a holding mechanism according to an embodiment of the present invention.
Figure 2:
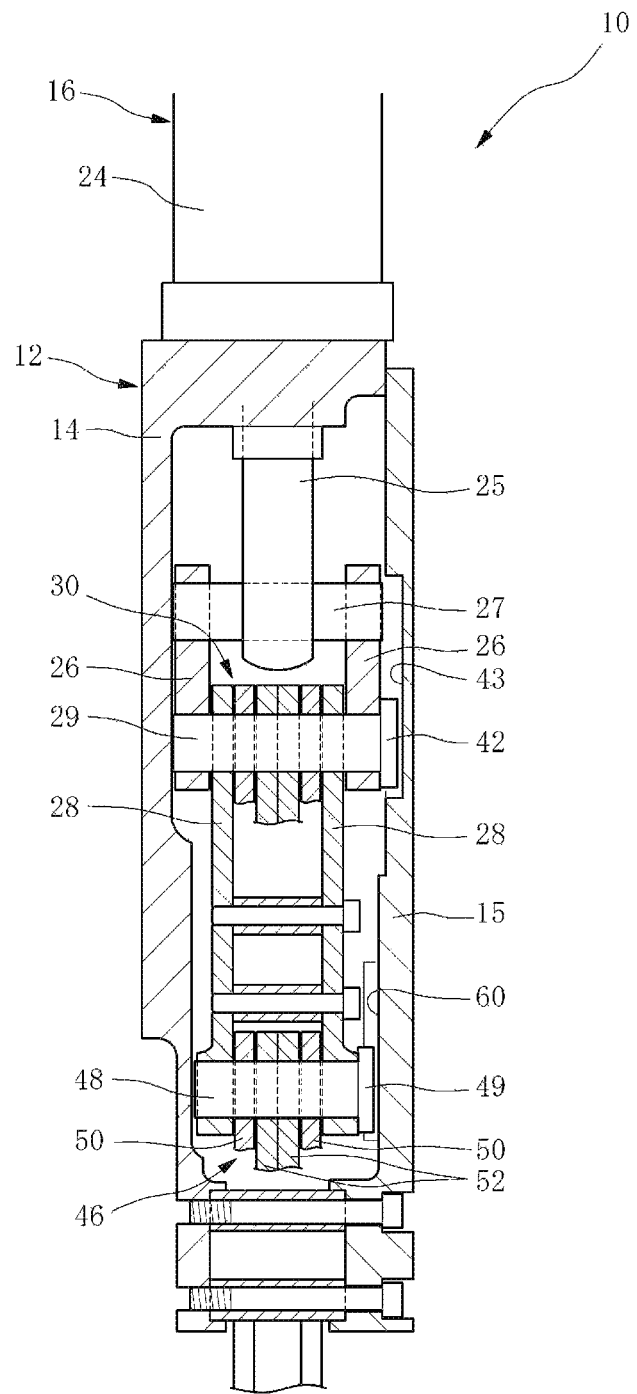
FIG. 2 is a sectional view taken on line II-II in FIG. 1A.
Figure 3:
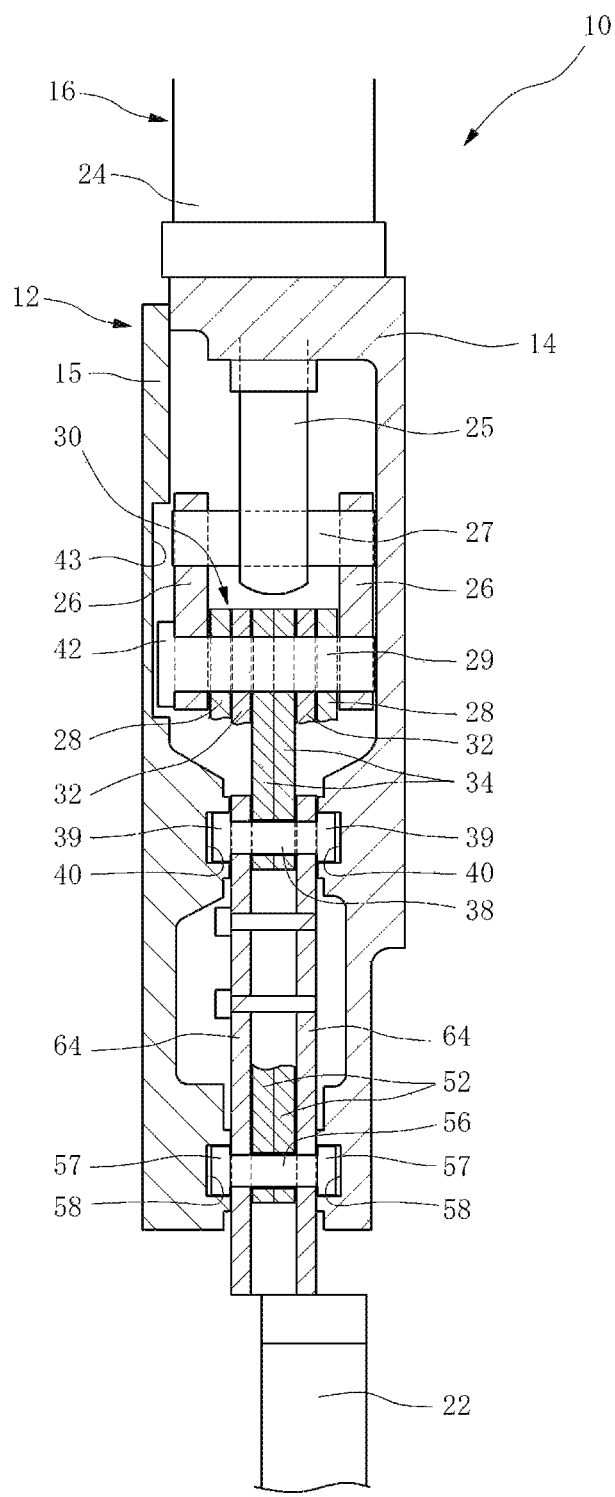
FIG. 3 is a sectional view taken on line in FIG. 1A.

FIGS. 1A and 1B are views showing a configuration of a holding device having a holding mechanism according to an embodiment of the present invention. FIG. 2 is a sectional view taken on line II-II in FIG. 1A. FIG. 3 is a sectional view taken on line III-III in FIG. 1A.

In FIG. 1A, the reference numeral 10 represents a holding device, which is attached to a transfer device of a multistage forging press machine in which a plurality of forging portions having dies and punches are arranged side by side in a horizontal direction. The holding device serves to hold a workpiece when the workpiece is conveyed from one stage to the next stage.

The reference numeral 12 represents a housing forming a base of the holding device 10. The housing 12 is constituted by a case body 14 and a cover 15. Incidentally, FIG. 1A shows the housing 12 from which the cover 15 has been removed.

In FIG. 1A, the reference numeral 16 represents an air cylinder as a driving unit; the reference numeral 18 represents a link mechanism received inside the housing 12; and the reference numerals 20 and 22 represent a pair of holding claws.

In the present embodiment, a forward/backward motion of the air cylinder 16 in a vertical direction is converted into an opening/closing motion in a horizontal direction by the link mechanism 18, and the opening/closing motion is transmitted to the holding claws 20 and 22 connected to an output end of the link mechanism 18.

A body portion 24 of the air cylinder 16 is attached and fixed to an upper end face of the housing 12. From the body portion 24, an output shaft 25 extends into the housing 12 in the illustrated downward direction. The output shaft 25 moves forward/backward in the illustrated up/down direction (the vertical direction) due to air introduced into the body portion 24.

At a front end of the output shaft 25, one ends of first driving links 26 constituting a part of the link mechanism 18 are rotatably connected through a connection pin 27. Second driving links 28 are rotatably connected to the other ends of the first driving links 26 through a connection pin 29.

Incidentally, in the present embodiment, as shown in FIG. 2, two first driving links 26 and two second driving links 28 are provided to be separated respectively in symmetric positions with respect to the center line of the output shaft 25.

Thus, when the output shaft 25 of the air cylinder 16 moves forward/backward in the vertical direction, the first driving links 26 and the second driving links 28 also move forward/backward in the vertical direction accordingly.

In the present embodiment, a driving link moving together with the output shaft 25 is constituted by the first driving links 26 and the second driving links 28.

In the present embodiment, each of the first driving links 26 is provided between the output shaft 25 and a corresponding one of the second driving links 28 in order to absorb displacement in the horizontal direction occurring between the output shaft 25 and the second driving link 28. Thus, the second driving link 28 can also move in the horizontal direction in FIG. 1A when the second driving link 28 is moving forward/backward in the vertical direction in FIG. 1A.

A first opening/closing motion generating unit 30 for converting the forward/backward motion of each second driving link 28 into an opening/closing motion in the horizontal direction is rotatably connected to one end side of the second driving link 28 through a connection pin 29.

The first opening/closing motion generating unit 30 includes a pair of tilting links 32 and 34, a connection pin 29, and slide pins 36 and 38. The tilting links 32 and 34 are separated to extend in opposite directions to each other. One ends of the tilting links 32 and 34 are rotatably connected to each other through the connection pin 29. The slide pins 36 and 38 are provided at the other ends of the tilting links 32 and 34 respectively.

Incidentally, in the present embodiment, as shown in FIG. 3, two tilting links 32 and two tilting links 34 are provided to be separated in symmetric positions with respect to the center line of the output shaft 25 respectively.

Flange portions 39 each having a quadrangular shape in planar view are formed in both end portions of each of the slide pins 36 and 38, respectively. The flange portions 39 are slidably and movably engaged with guide grooves 40 formed in the case body 14 and the cover 15 and extending in the horizontal direction.

In addition, another flange portion 42 having a quadrangular shape in planar view is formed in one end portion (on the cover 15 side) of the connection pin 29. The flange portion 42 is slidably engaged with a guide groove 43 formed in the cover 15.

In the first opening/closing motion generating unit 30, the slide pins 36 and 38 move to be closed to each other in the horizontal direction when the connection pin 29 is lifted upward. On the contrary, when the connection pin 29 is pushed downward, the slide pins 36 and 38 move to be opened from each other in the horizontal direction.

A second opening/closing motion generating unit 46 for converting the forward/backward motion of the second driving links 28 into an opening/closing motion in the horizontal direction is rotatably connected to the other end side of the second driving links 28.

The second opening/closing motion generating unit 46 for converting the forward/backward motion of each second driving link 28 into an opening/closing motion in the horizontal direction is rotatably connected to the other end side of the second driving link 28 through a connection pin 48.

The second opening/closing motion generating unit 46 includes a pair of tilting links 50 and 52, the connection pin 48, and slide pins 54 and 56. The tilting links 50 and 52 are separated to extend in opposite directions to each other. One ends of the tilting links 50 and 52 are rotatably connected to each other through the connection pin 48. The slide pins 54 and 56 are provided at the other ends of the tilting links 50 and 52 respectively.

Flange portions 57 each having a quadrangular shape in planar view are formed in both end portions of each of the slide pins 54 and 56, respectively. The flange portions 57 are slidably and movably engaged with guide grooves 58 formed in the case body 14 and the cover 15 and extending in the horizontal direction.

In addition, another flange portion 49 having a quadrangular shape in planar view is formed in one end portion (on the cover 15 side) of the connection pin 48. The flange portion 49 is slidably engaged with a guide groove 60 formed in the cover 15.

Also in the second opening/closing motion generating unit 46, in the same manner as in the first opening/closing motion generating unit 30, the slide pins 54 and 56 move to be closed to each other in the horizontal direction when the connection pin 48 is lifted upward. On the contrary, when the connection pin 48 is pushed downward, the slide pins 54 and 56 move to be opened from each other in the horizontal direction.

The first opening/closing motion generating unit 30 and the second opening/closing motion generating unit 46 provided in the vertical direction along the second driving links 28 are set so that their tilting links 32 and 50 on the left side of FIG. 1A can have the same link length, and their slide pins 36 and 54 on the left side of FIG. 1A can be located in the same position in the horizontal direction.

In the same manner, the first opening/closing motion generating unit 30 and the second opening/closing motion generating unit 46 are set so that their tilting links 34 and 52 on the right side of FIG. 1A can have the same link length, and their slide pins 38 and 56 on the right side of FIG. 1A can be located in the same position in the horizontal direction.

The reference numerals 62 and 64 represent a pair of output links extending in the vertical direction respectively.

The output link 62 on the left side of FIG. 1A is connected to the slide pin 36 of the first opening/closing motion generating unit 30 and the slide pin 54 of the second opening/closing motion generating unit 46, while the output link 64 on the right side of FIG. 1A is connected to the slide pin 38 of the first opening/closing motion generating unit 30 and the slide pin 56 of the second opening/closing motion generating unit 46. When the pair of output links 62 and 64 move to be opened/closed in the horizontal direction, the output links 62 and 64 move in the horizontal direction in accordance with the positions of the slide pins while keeping parallelism to each other.

Incidentally, in the present embodiment, as shown by the output links 64 in FIG. 3, two pairs of output links 62 and 64 are provided in symmetric positions with respect to the center line of the output shaft 25 respectively.

Holding claws 20 and 22 are connected to lower ends of the pairs of output links 62 and 64 respectively.

As shown in FIG. 1A, the pair of holding claws 20 and 22 are disposed to be opposed to each other in the horizontal direction so that their holding faces for holding a workpiece can look inward. In the present embodiment, a holding face 21 of the holding claw 20 on the left side of FIG. 1A is formed into a flat face, while a holding face 23 of the holding claw 22 on the right side of FIG. 1A is formed into a V-shaped groove.

Each slope formed in the holding face 23 is inclined in the vertical direction by an angle θ with respect to an imaginary line in the horizontal direction. In the present embodiment, the angle θ is set at 60°.

In the present embodiment, a workpiece whose outer circumference is circular is supported at three points by the pair of holding claws 20 and 22.

As shown in FIG. 1B and FIG. 2, the guide groove 43 for guiding the movement of the connection pin 29 of the first opening/closing motion generating unit 30 and the guide groove 60 for guiding the movement of the connection pin 48 of the second opening/closing motion generating unit 46 are formed in the cover 15.

As shown in FIG. 1B, the guide groove 43 is provided to be inclined toward the holding claw 20 having the flat face (on the left side of FIG. 1B) by an angle α with respect to an imaginary line in the vertical direction perpendicular to the horizontal direction. The flange portion 42 of the connection pin 29 is slidably and movably engaged with the guide groove 43.

On the other hand, the guide groove 60 provided under the guide groove 43 is also provided to be inclined by the angle α with respect to the imaginary line in the vertical direction in the same manner as the guide groove 43. The flange portion 49 of the connection pin 48 is slidably and movably engaged with the guide groove 60.

In the present embodiment, when the pair of holding claws 20 and 22 are moved to be closed to each other, the connection pins 29 and 48 of the first and second opening/closing motion generating units 30 and 46 are moved to be inclined toward the holding claw 20 having the flat face rather than in the vertical direction. Thus, the holding claw 22 having the V-shaped groove is moved more than the holding claw 20 having the flat face, so as to effectively prevent misalignment of the workpiece W when the outer diameter of the workpiece W is changed.

The guide grooves 43 and 60 are provided so that the connection pins 29 and 48 can be moved in the aforementioned inclination directions.

Next, a method for obtaining a suitable inclination of the guide groove 60 in order to prevent the misalignment of the workpiece will be described with reference to FIGS. 4A and 4B. Incidentally, FIGS. 4A and 4B show each member schematically.

Figure 4A:
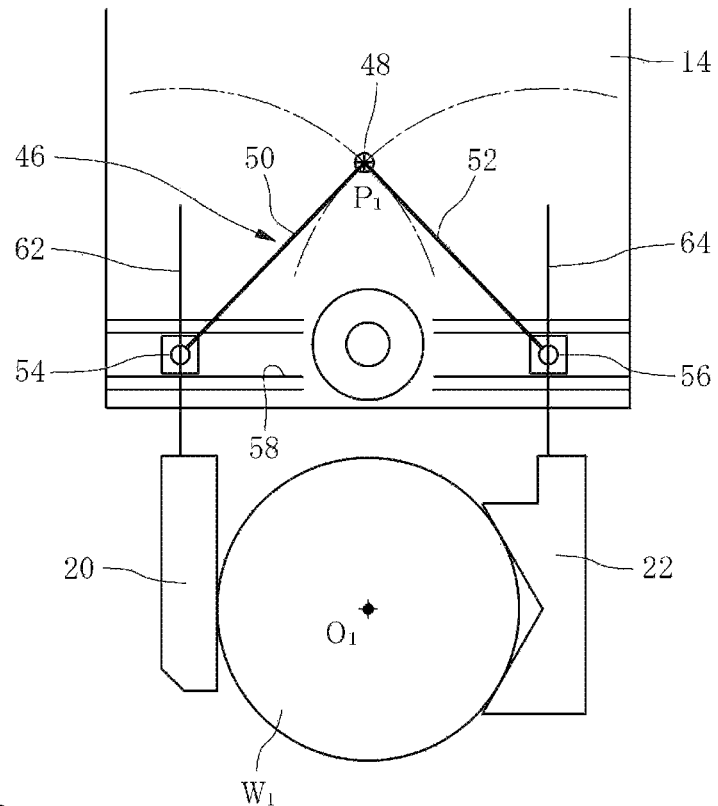
FIGS. 4A and 4B are views for explaining a method for obtaining an inclination of a guide groove.

FIG. 4A shows a state in which a workpiece $W_1$ having a largest diameter ($r_1$) to be held by the holding device 10 according to the present embodiment has been held. Assume that $O_1$ designates the central position of the workpiece in this state.

In this state, an imaginary circle is drawn using a link length of the tilting link 50 as its radius. The link length is a length between the center of the connection pin 48 on one end side of the tilting link 50 and the center of the slide pin 54 on the other end side. Further, another imaginary circle is drawn using a link length of the tilting link 52 as its radius. The link length is a length between the center of the connection pin 48 on one end side of the tilting link 52 and the center of the slide pin 56 on the other end side. An intersection point of the two imaginary circles is obtained as a position $P_1$ of the connection pin 48.

Figure 4B:
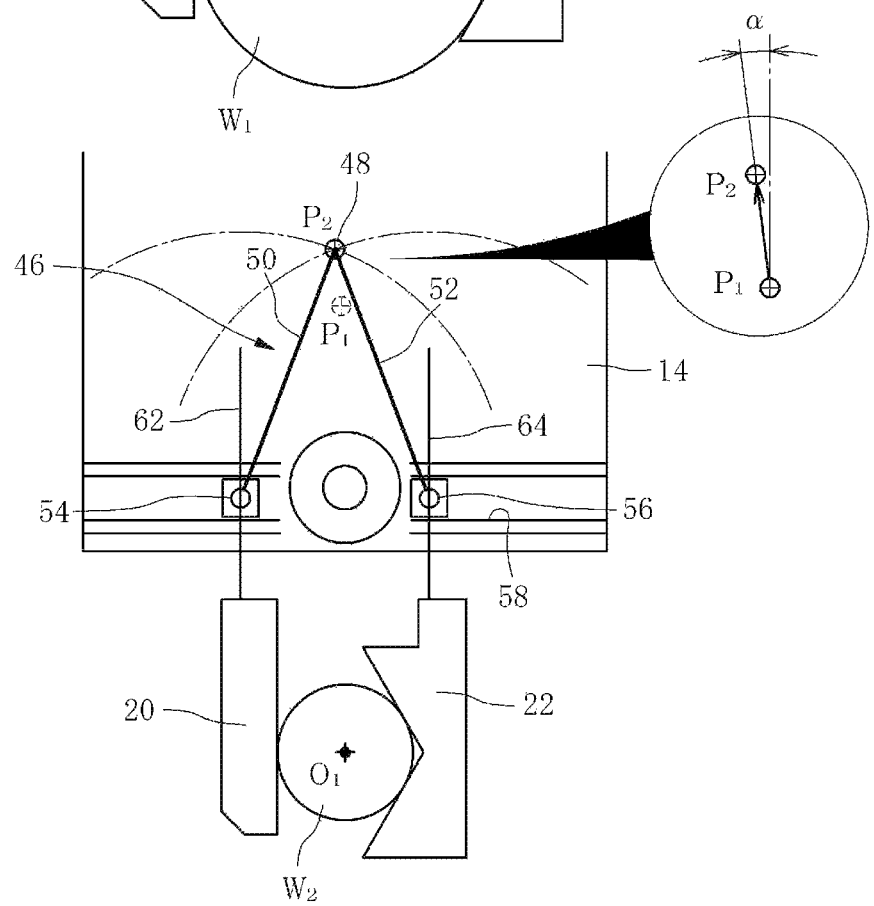

Next, as shown in FIG. 4B, the pair of holding claws 20 and 22 are moved to be closed to each other while keeping the central position $O_1$ of the workpiece as it is. Thus, a state in which a workpiece $W_2$ having a smallest diameter ($r_2$) to be held by the holding device 10 according to the present embodiment has been held is drawn.

In this state, an imaginary circle is drawn using a link length of the tilting link 50 as its radius. The link length is a length between the center of the connection pin 48 on one end side of the tilting link 50 and the center of the slide pin 54 on the other end side. Further, another imaginary circle is drawn using a link length of the tilting link 52 as its radius. The link length is a length between the center of the connection pin 48 on one end side of the tilting link 52 and the center of the slide pin 56 on the other end side. An intersection point of the two imaginary circles is obtained as a position $P_2$ of the connection pin 48.

As shown in the partially enlarged view of FIG. 4B, a line connecting the obtained points $P_1$ and $P_2$ is inclined toward the holding claw 20 having the flat surface by the angle α with respect to an imaginary line in the vertical direction perpendicular to the horizontal direction.

The workpiece center is at the position $O_1$ in both the positions $P_1$ and $P_2$ of the connection pin 48 thus obtained. Therefore, if the connection pin 48 is positioned on a line connecting the points $P_1$ and $P_2$, the center of any workpiece held by the holding device 10 can be always set at or near the position $O_1$ even when the workpiece held by the holding device 10 has any size. Thus, misalignment can be effectively prevented from occurring as in the background art when the outer diameter of the workpiece is changed.

Accordingly, the guide groove 60 for guiding the connection pin 48 is provided to be inclined by the angle α with respect to the imaginary line in the vertical direction so that the connection pin 48 can move on the line connecting the points $P_1$ and $P_2$, in the same manner as in the aforementioned track of the connection pin 48.

Although description has been made about the guide groove 60 for guiding the connection pin 48, the same thing can be applied to the guide groove 43 for guiding the connection pin 29.

Figure 5:
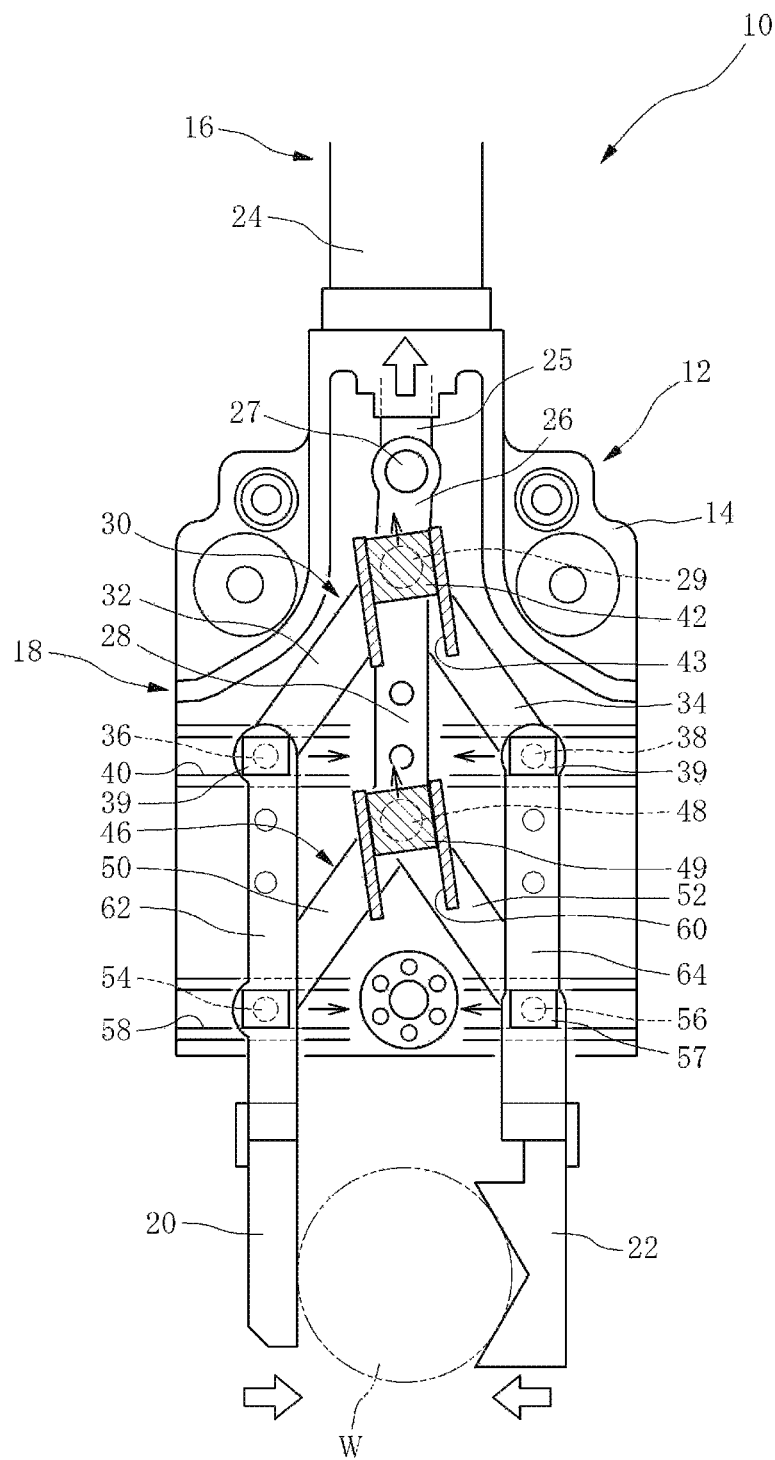
FIG. 5 is a view for explaining a holding operation of the holding device.
Figure 6A:
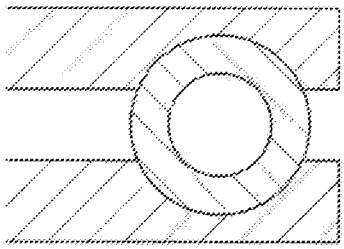
FIGS. 6A to 6C are views showing shapes of holding claws in the background art.
Figure 6B:
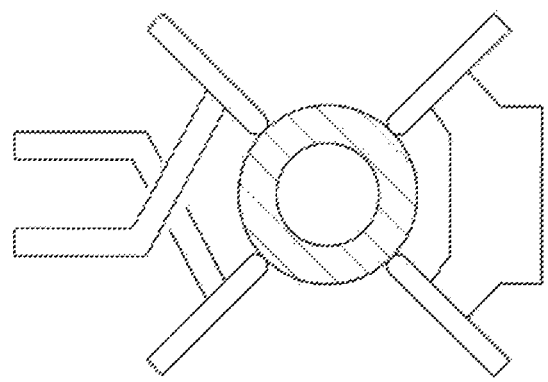
Figure 6C:
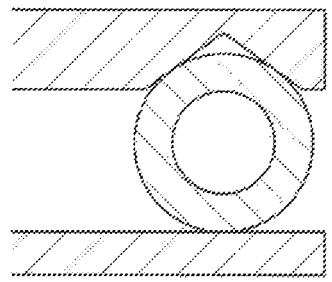
Figure 7A:
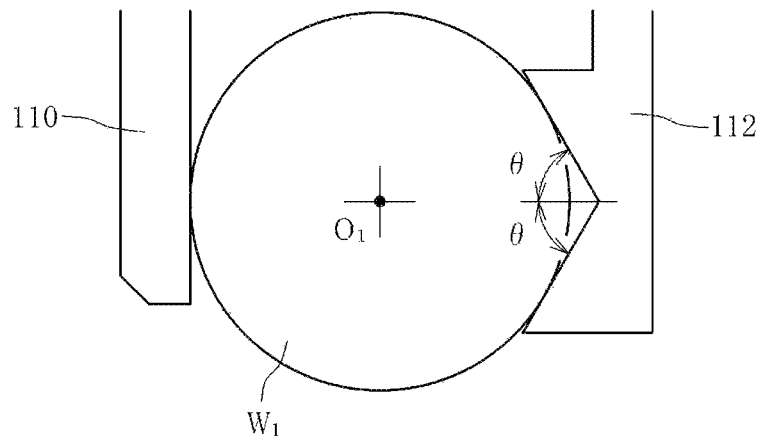
FIGS. 7A to 7C are views for explaining a problem in three-point support.
Figure 7B:
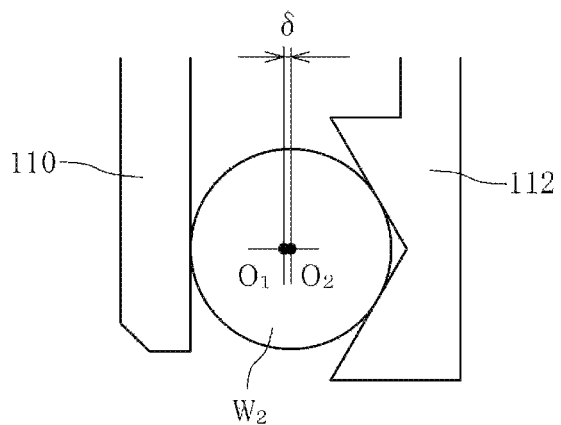
Figure 7C:
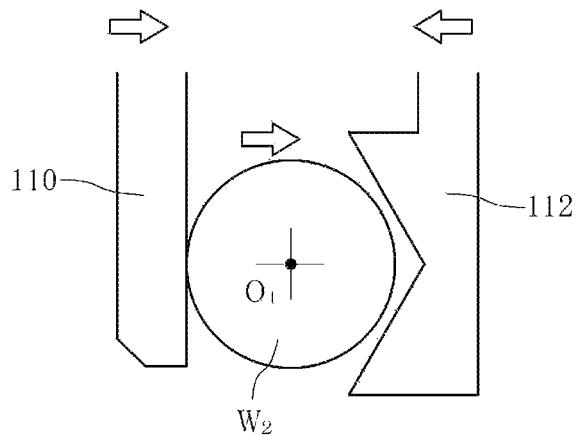

Next, an operation of holding a workpiece in the holding device 10 having the holding mechanism according to the present embodiment will be described. In a state where the holding claws 20 and 22 are located on both sides of the workpiece W in the horizontal direction (in the state shown in FIG. 1A), the air cylinder 16 is driven to lift up the first driving links 26 and the second driving links 28 together with the output shaft 25. Thus, as shown in FIG. 5, the connection pin 29 and the connection pin 48 connected to the second driving links 28 are guided by the guide grooves 43 and 60 respectively to move upward (or in particular, obliquely toward the left upper) in FIG. 5.

As a result, all the slide pins 36 and 38 of the first opening/closing motion generating unit 30 and the slide pins 54 and 56 of the second opening/closing motion generating unit 46 move in the closing directions toward their central portion. The output links 62 and 64 connected to those slide pins, and the holding claws 20 and 22 attached to the end portions of the output links 62 and 64 also move in the closing directions toward their central portion.

In the present embodiment, the track of the connection pin 29 of the first opening/closing motion generating unit 30 and the track of the connection pin 48 of the second opening/closing motion generating unit 46 are defined by the guide grooves 43 and 60 respectively so as to coincide with the tracks inclined by the angle α and obtained in FIGS. 4A and 4B, respectively. When the holding claws 20 and 22 are moving in the closing directions, the first opening/closing motion generating unit 30 and the second opening/closing motion generating unit 46 move toward the holding claw 20 having the flat face (on the left side of each drawing) in accordance with the inclinations of the guide grooves 43 and 60 respectively. Thus, the holding claw 22 having the V-shaped groove moves by a moving amount more than that of the holding claw 20 having the flat face.

Thus, misalignment of the workpiece W caused by shortage of the moving amount of the holding claw 22 having the V-shaped groove can be prevented, so that the workpiece W can be held in the state where the workpiece center is kept in a fixed position even when the workpiece W to be held has any size.

Description has been made about the operation in which the holding claws 20 and 22 move in the closing directions. When the holding claws 20 and 22 move in the opening directions, the first driving links 26 and the second driving links 28 are pushed downward together with the output shaft 25 in the state of FIG. 5. Thus, the connection pin 29 and the connection pin 48 connected to the second driving links 28 are guided by the guide grooves 43 and 60 respectively to move to the lower side of FIG. 5 (or in particular, obliquely to the right lower side).

Thus, all the slide pins 36 and 38 of the first opening/closing motion generating unit 30 and the slide pins 54 and 56 of the second opening/closing motion generating unit 46 move in the opening directions, and the output links 62 and 64 connected to those slide pins, and the holding claws 20 and 22 also move in the opening directions.

Also in the movement in the opening direction, the track of the connection pin 29 of the first opening/closing motion generating unit 30 and the track of the connection pin 48 of the second opening/closing motion generating unit 46 are defined by the guide grooves 43 and 60 respectively. When the holding claws 20 and 22 are moving in the opening directions, the first opening/closing motion generating unit 30 and the second opening/closing motion generating unit 46 move toward the holding claw 22 having the V-shaped groove (on the right side of each drawing) in accordance with the inclinations of the guide grooves 43 and 60 respectively. Thus, the holding claw 22 having the V-shaped groove moves by a moving amount more than that of the holding claw 20 having the flat face.

In this manner, according to the present embodiment, when the pair of holding claws are moved in the closing directions, or on the contrary, when the pair of holding claws are moved in the opening directions, the holding claw 22 having the V-shaped groove can be moved more than the holding claw 20 having the flat face. Thus, the problem caused by the three-point support in the background art, that is, the misalignment of the workpiece caused by the shortage of the moving amount of the holding claw 22 having the V-shaped groove can be effectively prevented.

Therefore, according to the present embodiment, it is possible to dispense with work of replacement of the holding claws 20 and 22 and adjustment thereof when the outer diameter of the workpiece is changed. Thus, the facility operation rate of the target facilities can be enhanced.

In addition, in the present embodiment, two sets of opening/closing motion generating units 30 and 46 are provided in the vertical direction along the second driving links 28 so that each of the output links 62 and 64 can be connected and supported by the slide pins at two places in the vertical direction. It is therefore possible to prevent the output links 62 and 64 from tilting. Thus, the positional accuracy of the holding claws 20 and 22 can be enhanced.

Figure 8:
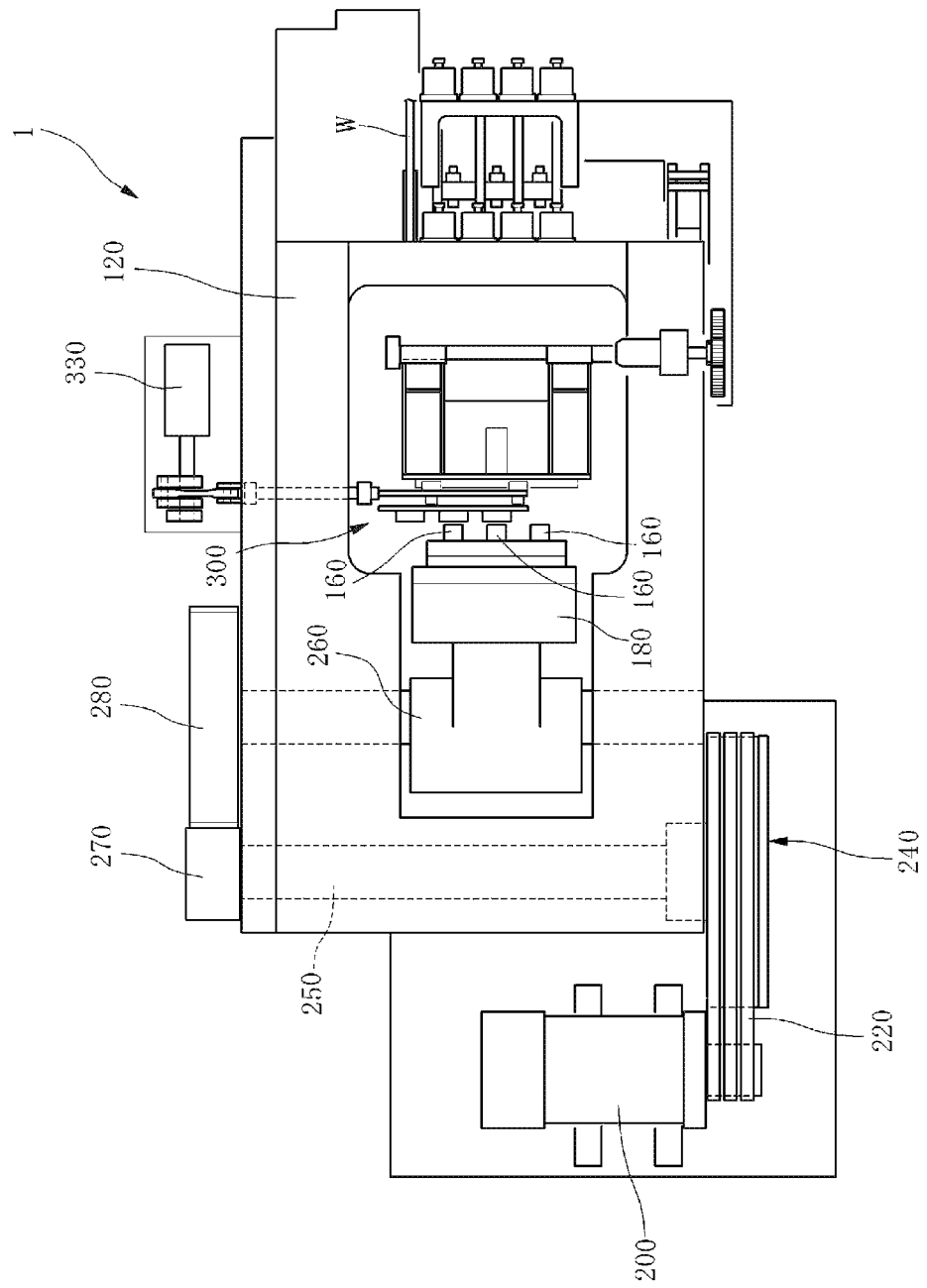
FIG. 8 is a plan view of a multistage forging press machine provided with the holding mechanism according to an embodiment of the present invention.

FIG. 8 is a view showing a multistage forging press machine provided with a holding mechanism of a transfer device according to the present embodiment. In FIG. 8, the reference numeral 1 represents a multistage forging press machine (hereinafter also referred to as forging press machine), in which a plurality (here, three stages) of forging portions for forging a workpiece are provided side by side at predetermined intervals in the horizontal direction inside a frame 120 having a box-like shape.

Each forging portion is constituted by a die fixed to the frame 120, and a punch 160 disposed to be opposed to the die. Such punches 160 are attached to a front end portion of a ram 180 so that a material (workpiece) can be formed concurrently in each forging portion by forward movement of the ram 180.

A main motor 200 serving as a power source for the ram 180 is provided in the forging press machine 1 in the present embodiment. The main motor 200 is connected to a flywheel 240 through a belt 220. The flywheel 240 is connected to the ram 180 through a crankshaft 260.

In detail, a pinion gear 270 provided at an end portion of a fly wheel shaft 250 on the opposite side to the fly wheel 240 and a large gear 280 provided at an end portion of the crank shaft 260 are connected to be engaged with each other.

Thus, in the present embodiment, as the fly wheel 240 is rotated by the power of the main motor 200, the ram 180 moves forward and backward due to the power of the fly wheel 240. That is, the punches 160 attached to the front end side of the ram 180 move forward and backward relatively to the dies to thereby perform forging.

In the forging press machine 1 thus configured, a material (workpiece W) supplied from the outside is passed through the three stages of forging portions sequentially. Thus, the workpiece W is formed into a predetermined shape. On this occasion, the workpiece W is conveyed to each forging portion by a transfer device 300.

A product that has been completely forged is conveyed to the outside of the machine by a not-shown conveyance device.

As shown in FIG. 8, in the forging press machine 1 according to the present embodiment, a space above the frame 120 is made open in a part where the forging portions are disposed. In this open space, a body part of the transfer device 300 is disposed in a position above the dies.

FIG. 9 is a view showing a schematic configuration of the transfer device 300.

In FIG. 9, the reference numeral 10 represents a holding device provided with a pair of holding claws 20 and 22 for holding a workpiece. Such holding devices 10 are attached to a longitudinal mounting surface of a conveyance plate 31 and at equal intervals.

Incidentally, the reference numeral 390 in FIG. 9 represents a solenoid valve for supplying high pressure air to an air cylinder 16 to open and close the holding claws 20 and 22 in each holding device 10.

A servo motor 33 is connected to the conveyance plate 31 so that the conveyance plate 31 and the holding devices 10 can be moved in a horizontal direction in which the forging portions are provided side by side.

In some cases, a servo motor for moving the conveyance plate 31 in the vertical direction may be attached to the conveyance plate 31 in addition to the servo motor 33 for moving the conveyance plate 31 in the horizontal direction. According to this configuration, the conveyance plate 31 can be also moved in the vertical direction.

The reference numeral 380 represents a control portion for controlling a workpiece conveyance operation in the transfer device 300. The operation of moving the conveyance plate 31 in the horizontal direction and the operation of opening/closing the holding claws 20 and 22 in each holding device 10 are controlled by the control portion 380 based on an encoder signal from the crankshaft 260 side which moves the ram 180 forward/backward.

In addition, in the control portion 380, as will be described later, whether there occurs a chucking error of the holding claws 20 and 22 of each holding device 10 for a workpiece or not can be determined based on an output from a sleeve sensor 98 attached to each holding device 10.

Next, FIGS. 10A and 10B are views showing a body portion 24 of the air cylinder 16 and peripheral portions thereof.

As shown in FIG. 10A, a piston 95 sliding inside the body portion 24 of the air cylinder 16 is attached to the base end side of the output shaft 25 of the air cylinder 16.

Operating chambers 96 and 97 defined by the piston 95 and a vessel of the body portion 24 are formed on both sides of the piston 95 in the vertical direction.

In the present embodiment, predetermined-pressure air is supplied to one of the operating chambers, and the air is discharged from the other operating chamber. Thus, the piston 95 and the output shaft 25 are moved forward and backward in the vertical direction.

In addition, the sleeve sensor 98 as a position detection unit for detecting the position of the output shaft 25 is provided in an opposite end portion of the output shaft 25 to the holding claws.

The sleeve sensor 98 in the present embodiment is constituted by a sensor body 99, a detection rod 100, and a sleeve 101 fitted onto the detection rod 100. The sleeve 101 is made of metal and formed into a cylindrical shape.

A thin coil for generating a high frequency magnetic field is received inside the detection rod 100. A value of voltage outputted from the sensor body 99 changes in accordance with the strength of electromagnetic coupling acting between the detection rod 100 and the sleeve 101. The electromagnetic coupling occurs when the sleeve 101 fitted onto the detection rod 100 moves axially relatively.

FIG. 10B is an enlarged view showing the detection rod 100 and the sleeve 101.

In FIG. 10B, the reference numeral 103 represents a bracket attached to the body portion 24 of the air cylinder 16. The bracket 103 supports the detection rod 100 of the sleeve sensor 98 so as to fix the detection rod 100.

On the other hand, the reference numeral 102 represents a connection member attached to an end portion of the output shaft 25 and extending upward in the axial direction. A guide hole 104 opened upward is formed in a shaft part of the connection member 102. The sleeve 101 is attached to an inner circumferential surface of the guide hole 104.

Thus, according to the present embodiment, when the output shaft 25 moves forward/backward linearly in the axial direction in order to bring the holding claws 20 and 22 into an opening/closing motion, the sleeve 101 attached to the output shaft 25 also moves linearly in the axial direction. As a result, the relative position of the sleeve 101 to the detection rod 100 changes so that a voltage value corresponding to the position of the output shaft 25 can be outputted from the sleeve sensor 98.

The output value also corresponds to the opening degree of the holding claws 20 and 22. Thus, the opening degree of the holding claws 20 and 22 can be detected in the control portion 380 based on the output from the sleeve sensor 98.

Incidentally, in a case where a chucking error occurs when a workpiece is held, the output corresponding to the position of the output shaft 25 is supplied to the control portion 380 from the sleeve sensor 98 in the present embodiment. Therefore, the control portion 380 can detect the chucking error based on the output from the sleeve sensor 98.

For example, in a case where a workpiece $W_2$ having a small outer diameter is held by the holding claws 20 and 22, an upper limit value and a lower limit value are set in advance for an output value $F_2$ from the sleeve sensor 98 when the workpiece $W_2$ is normally held.

When the output value from the sleeve sensor 98 is beyond the upper limit value in spite of the closing operation of the holding claws 20 and 22, it is determined that the opening degree of the holding claws 20 and 22 is larger than that in a normal state, that is, the workpiece $W_2$ is held to be inclined obliquely. Thus, the control portion 380 suspends the operation of the transfer device 300.

On the contrary, when the output value from the sleeve sensor 98 is below the lower limit value, it is determined that the opening degree of the holding claws 20 and 22 is smaller than that in the normal state, that is, the workpiece $W_2$ is absent (not held). Also in this case, the control portion 380 suspends the operation of the transfer device 300.

In a case where a workpiece $W_1$ having a large outer diameter is held, an upper limit value and a lower limit value are set in advance for an output value $F_1$ from the sleeve sensor 98 when the workpiece $W_1$ is normally held.

In this manner, for each of outer diameters of workpieces to be held, an upper limit value and a lower limit value for detecting a chucking error are set in advance for an output value from the sleeve sensor 98 when the workpiece is normally held. Thus, a chucking error can be detected on workpieces having various sizes based on the output from the sleeve sensor 98.

According to the present embodiment, as has been described above, the sleeve sensor 98 is provided in an opposite end portion of the output shaft 25 to the holding claws, so that the position of the output shaft 25 corresponding to the opening degree of the holding claws 20 and 22 can be detected stably without being affected by scattering of scales or heat. Thus, a chucking error can be detected based on the detected position of the output shaft 25.

In addition, in the present embodiment, the motion of the output shaft 25 whose position should be detected is a simple motion in which the output shaft 25 moves forward and backward in its axial direction. Thus, the position of the output shaft 25 can be detected over a wide range in the axial direction by use of the sleeve sensor 98. It is therefore possible to detect a chucking error for a wide range of workpieces from a workpiece having a small outer diameter to a workpiece having a large outer diameter.

According the configuration of the present embodiment, the sleeve sensor 98 has a detection portion constituted by the detection rod 100 and the sleeve 101 fitted onto the detection rod 100 so that the sleeve 101 can move together with the output shaft 25. Therefore, even when the output shaft 25 has to be moved a long distance in the axial direction, the detectable length of the detection portion (the detection rod 100 and the sleeve 101) can be increased in the axial direction. Thus, it is possible to easily deal with the long-distance movement.

On that occasion, there occurs no interference between the detection portion and another component constituting the holding mechanism because the detection portion is provided in the opposite end portion of the output shaft 25 to the holding claws 20 and 22.

In the present embodiment, the pair of holding claws 20 and 22 move respectively to prevent displacement of the central position of the workpiece abutting against a pair of holding faces 21 and 23 of the holding claws 20 and 22 when the opening degree of the holding claws 20 and 22 is changed. Accordingly, the holding claws 20 and 22 can be used without replacement in spite of the changed outer diameter of the workpiece. According to the present embodiment, it is therefore possible to dispense with work of replacement of the holding claws and adjustment thereof following the replacement. Thus, the operation rate of the forging press machine 1 can be enhanced.

In this case, when the same holding claws 20 and 22 are used over a range from a workpiece having a small outer diameter to a workpiece having a large outer diameter, the holding claws 20 and 22 used have a wide range of opening degrees from a small degree to a large degree. In accordance therewith, the moving distance of the output shaft 25 is increased. However, the position of the output shaft 25 can be detected over a long moving distance in the present embodiment. It is therefore possible to detect a chucking error for workpieces having different outer diameters, from a workpiece having a small outer diameter to a workpiece having a large outer diameter.

The embodiment of the present invention has been described above in detail. However, the embodiment is merely an example. Although the aforementioned embodiment has a configuration in which a motion of the output shaft 25 in an upward direction of each drawing is converted into a motion of the holding claws in a closing direction, a link mechanism by which, on the contrary, a motion of the output shaft 25 in a downward direction of each drawing can be converted into a motion of the holding claws in the closing direction may be used in some cases.

In addition, although the track of the connection pin in an oblique direction is defined by the guide groove in the aforementioned embodiment, the output shaft itself may be inclined in an oblique direction to move the connection pin forward and backward in the oblique direction.

Further, the holding mechanism according to the present invention can be applied to various holding devices other than the holding device of the transfer device. In addition, the sensor as a position detection unit for detecting the position of the output shaft is not limited to the aforementioned sleeve sensor, but another displacement sensor such as a differential transformer type sensor may be used. In such a manner, the present invention can be carried out in various forms in which various changes are made thereon without departing from the gist of the invention.

The present application is based on Japanese Patent Application No. 2016-105671 filed on May 26, 2016, and Japanese Patent Application No. 2016-105672 filed on May 26, 2016, the contents of which are incorporated herein by reference.

DESCRIPTION OF REFERENCE NUMERALS AND SIGNS

1 multistage forging press machine
10 holding device
16 air cylinder (driving unit)
12 housing
18 link mechanism
20,22 holding claw
21, 23 holding face
25 output shaft
26 first driving link
28 second driving link
29, 48 connection pin
30 first opening/closing motion generating unit
32, 34, 50, 52 tilting link
36, 38, 54, 56 slide pin
43, 60 guide groove
46 second opening/closing motion generating unit
62, 64 output link
98 sleeve sensor (position detection unit)
100 detection rod
101 sleeve
300 transfer device
380 control portion (abnormality detection unit)

What is claimed is:

1. A holding mechanism, comprising:
   a pair of holding claws that are disposed to be opposed to each other on both sides of a workpiece in a horizontal direction, a holding face of one of the holding claws being formed into a flat face, a holding face of another holding claw being formed into a V-shaped groove;
   a driving unit that moves an output shaft forward and backward in a vertical direction; and
   a link mechanism that converts a forward/backward motion of the output shaft into an opening/closing motion in the horizontal direction and transmits the opening/closing motion to the pair of holding claws,
   wherein, when the pair of holding claws are moved to be opened/closed in the horizontal direction, the holding claw having the V-shaped groove is moved more than the holding claw having the flat face,
   wherein the link mechanism comprises:
      a pair of tilting links extending in opposite directions to each other, first ends of the tilting links being rotatably connect d to each other, and second ends of the tilting links respectively being connected to the pair of holding claws; and
      a connection pin connecting the first ends of the tilting links, and
   wherein, when the holding claws are moved in a closing direction, the connection pin moves in an inclination direction inclined from the vertical direction.

2. The holding mechanism according to claim 1, wherein the link mechanism further comprises:
   a driving link that is connected to the output shaft to move forward/backward together with the output shaft;
   an opening/closing motion generating unit comprising the pair of tilting links, the connection pin, and slide pins, the pair of tilting links being separated to extend in opposite directions to each other, the first ends of the tilting links being rotatably connected to each other through the connection pin, the tilting links being rotatably connected to the driving link through the connection pin, the slide pins being provided at the second ends of the tilting links respectively so that the slide pins move along guide grooves formed in a base and extending in the horizontal direction; and
   a pair of output links that are connected to the slide pins of the opening/closing motion generating unit and the holding claws so as to move the holding claws in the horizontal direction in accordance with positions of the slide pins, and
   wherein, when the holding claws are moved in a closing direction, the connection pin of the opening/closing motion generating unit is moved in the inclination direction inclined toward the holding claw having the flat face rather than in the vertical direction.

3. The holding mechanism according to claim 2, wherein a guide groove for guiding movement of the connection pin of the opening/closing motion generating unit is formed in the base, and the guide groove is provided to be inclined in the inclination direction.

4. The holding mechanism according to claim 2, wherein a plurality of the opening/closing motion generating units are provided in the vertical direction along the driving link.

5. The holding mechanism according to claim 3, wherein a plurality of the opening/closing motion generating units are provided in the vertical direction along the driving link.

6. The holding mechanism according to claim 1, further comprising:
- a position detection unit that is provided in an opposite end portion of the output shaft to the holding claws so as to detect a position of the output shaft, the position detection unit including a detection portion constituted by a detection rod and a sleeve fitted onto the detection rod so that one of the detection rod and the sleeve moves together with the output shaft; and
- an abnormality detection unit that detects a chucking error of the holding claws for the workpiece, based on an output from the position detection unit.

7. The holding mechanism according to claim 2, further comprising:
- a position detection unit that is provided in an opposite end portion of the output shaft to the holding claws so as to detect a position of the output shaft, the position detection unit including a detection portion constituted by a detection rod and a sleeve fitted onto the detection rod so that one of the detection rod and the sleeve moves together with the output shaft; and
- an abnormality detection unit that detects a chucking error of the holding claws for the workpiece, based on an output from the position detection unit.

8. The holding mechanism according to claim 3, further comprising:
- a position detection unit that is provided in an opposite end portion of the output shaft to the holding claws so as to detect a position of the output shaft, the position detection unit including a detection portion constituted by a detection rod and a sleeve fitted onto the detection rod so that one of the detection rod and the sleeve moves together with the output shaft; and
- an abnormality detection unit that detects a chucking error of the holding claws for the workpiece, based on an output from the position detection unit.

9. The holding mechanism according to claim 4, further comprising:
- a position detection unit that is provided in an opposite end portion of the output shaft to the holding claws so as to detect a position of the output shaft, the position detection unit including a detection portion constituted by a detection rod and a sleeve fitted onto the detection rod so that one of the detection rod and the sleeve moves together with the output shaft; and
- an abnormality detection unit that detects a chucking error of the holding claws for the workpiece, based on an output from the position detection unit.

10. The holding mechanism according to claim 5, further comprising:
- a position detection unit that is provided in an opposite end portion of the output shaft to the holding claws so as to detect a position of the output shaft, the position detection unit including a detection portion constituted by a detection rod and a sleeve fitted onto the detection rod so one of the detection rod and the sleeve moves together with the output shaft; and
- an abnormality detection unit that detects a chucking error of the holding claws for the workpiece, based on an output from the position detection unit.

11. The holding mechanism according to claim 1, wherein the pair of tilting links defines an acute angle that faces the pair of holding claws.

12. The holding mechanism according to claim 1, wherein the pair of tilting links defines an acute angle that faces away from the driving unit.

13. The holding mechanism according to claim 1, wherein, when the holding claws are moved in the closing direction, the connection pin moves toward the holding claw having the flat face in an inclined direction with respect to the vertical direction.

* * * * *